United States Patent [19]

Craig et al.

[11] 3,716,197
[45] Feb. 13, 1973

[54] WASTE DISPOSAL APPARATUS

[75] Inventors: Sam N. Craig, Devon; Ellis R. Warner, Jr., West Chester; Wayne T. Buckman, Pipersville, all of Pa.

[73] Assignee: Wascon Systems, Inc., Hatboro, Pa.

[22] Filed: Nov. 16, 1970

[21] Appl. No.: 89,852

[52] U.S. Cl. ................. 241/43, 241/46.17, 241/78, 241/152 A
[51] Int. Cl. .............................................. B02c 18/40
[58] Field of Search........... 241/43, 45, 46.17, 68, 76, 241/78, 101, 152

[56] References Cited

UNITED STATES PATENTS

| | | | |
|---|---|---|---|
| 3,565,350 | 2/1971 | Combs et al. | 241/43 |
| 3,549,092 | 12/1970 | Baxter, Jr. | 241/46.17 X |
| 3,113,733 | 12/1963 | Carlson | 241/68 |
| 3,415,378 | 12/1968 | Fukuda | 241/101 X |

Primary Examiner—Granville Y. Custer, Jr.
Attorney—Paul & Paul

[57] ABSTRACT

An apparatus is provided, wherein waste solids are prepared for disposal. The solids are wet pulped into a slurry form, having some solid material therein, with the solids then passing into a trap, whereby larger solid particles that have not been sufficiently reduced in size in the pulper may be collected at the bottom, for carriage by an ejector toward which the particles may optionally receive assistance from a water line, to discharge receptacle. The slurry passes from the trap into another apparatus which further comminutes solids carried by the slurry, for delivery to a press, whereby water is extracted therefrom, with the water then being recycled to the pulper, and with the compacted solids from the press being discharged into the discharge receptacle. A vent is provided, at the outlet of the trap.

6 Claims, 3 Drawing Figures

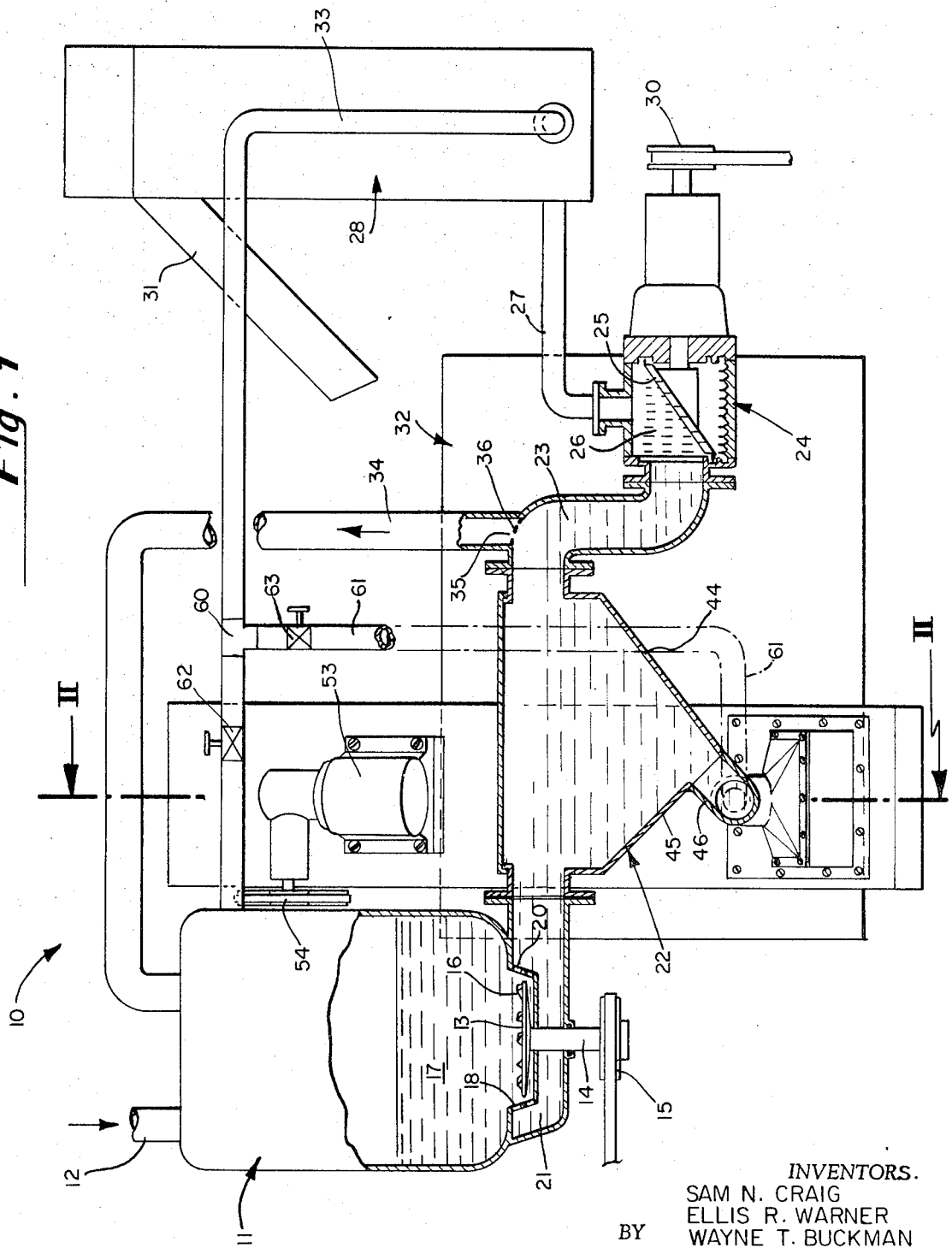

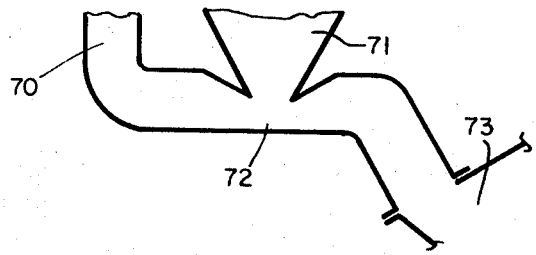
Fig. 3
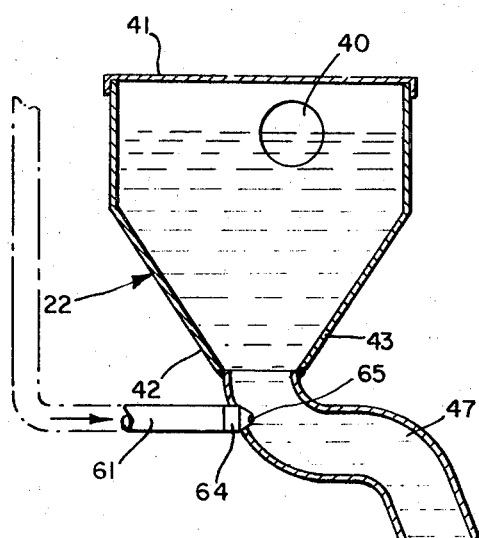
Fig. 2
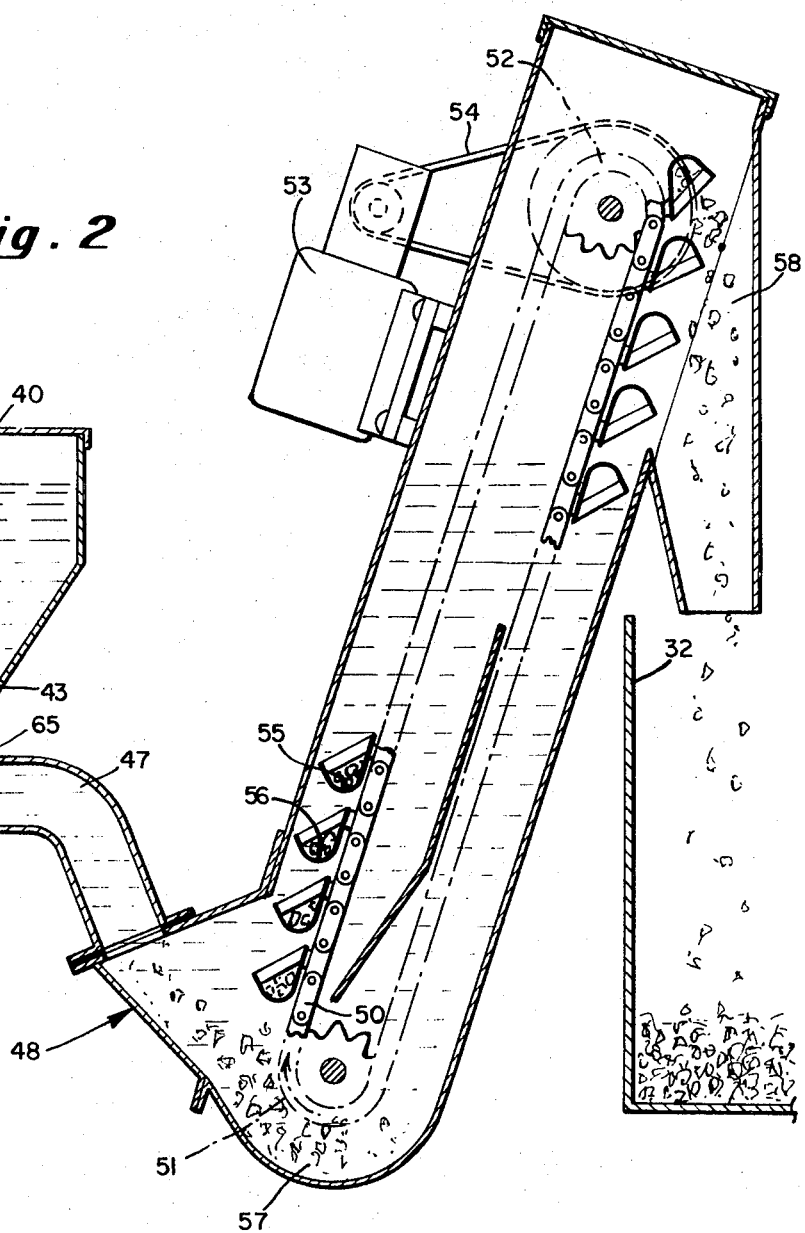
INVENTORS.
SAM N. CRAIG
ELLIS R. WARNER
BY WAYNE T. BUCKMAN
Paul + Paul
ATTORNEYS,

WASTE DISPOSAL APPARATUS

BACKGROUND OF THE INVENTION

Various techniques have been developed in the past, directed toward comminution of waste material, into a size that will enable the material to be carried away via sewage pipe lines, and the like. In other instances, the waste has been reduced in size, to enable handling of the same by conventional techniques, such as by trucking the waste to a disposal site.

In either type of system, as well as in other types of systems, it becomes desirable to shred an aggregate mixture of waste, such as cardboard, paper, rags, plastics, glass containers, metal cans and the like. By shredding such material, and optionally grinding the same thereafter, this waste is substantially reduced in volume, and may thereafter be handled by conventional techniques, with great facility.

Most particularly, in comminution techniques, wherein a pulper of the type that abrades the waste material in a liquid medium, for shredding, cutting and tearing the same, whereby particles are entrained and otherwise conveyed in a liquid medium after they have been reduced in size, various techniques have been employed. One novel technique is to deliver such pulped slurry either directly to a press, or preferably passing through another comminution stage, most preferably of the type wherein a positive shearing or like cutting action is effected on particles carried in the slurry.

In many systems, it becomes desirable to minimize the time in which a given portion of the slurry remains within a given apparatus. Thus, for example, in the use of a pulping apparatus that performs abrading upon solid debris in a liquid medium, if a screen size at the bottom of the pulping apparatus has sufficiently small passageways, and if the debris is pulped within the pulper for a sufficiently long period of time, virtually all of the material being pulped will be reduced to a size sufficient to be pressed. However, if it is acceptable that the discharge from the pulping apparatus would contain a small percentage of material that has not been comminuted to the desired pre-selected size, the length of time for any give batch of waste material to remain in the pulper is enormously reduced. Thus, if the discharge from the pulper can contain an acceptable percentage of substantially unpulped or insufficiently pulped solids, the pulping apparatus then achieves a greatly increased capacity for handling material. In accordance with the present invention, an apparatus is utilized at the discharge end of the pulper, in order to permit an increase in the capacity of the pulper, in such a manner as to obviate the problems discussed above.

SUMMARY OF THE INVENTION

The present invention is directed toward providing, downstream of a pulping tank, a trap tank or hopper, whereby the discharge from the pulping apparatus contains some undesirably sized particles, generally glass, steel and the like, whereby the trap receives the discharge from the pulping apparatus, for later delivery to a selected subsequent piece of apparatus, but wherein these undesirably sized solids accumulate in the trap and are discharged from the bottom thereof, to an ejector which physically removes such solids from the slurry. The slurry with the solids removed therefrom then leaves the trap, and continues optionally onto another comminution station, or to a press, through both in serial fashion, or into sewer discharge, as desired.

Accordingly, it is a primary object of this invention to provide a trap apparatus that is adapted to be used with a pulping tank, for increasing the handling capacity of the pulper.

It is a further object of this invention to provide a novel trap for collecting solids from a slurry or like liquid medium, with an ejector for lifting solids from the liquid medium.

It is another object of this invention to provide a novel two-stage grinding or comminution apparatus, utilizing a trap with a solids ejector therefor.

It is a further object of this invention to provide a novel complete system, including a pulper, another comminution apparatus downstream of the pulper, a trap disposed between the pulper and other comminution apparatus, with an ejector for removing solids from the trap, with a press disposed operationally downstream of the other comminution apparatus, with suitable vent and water return lines, and with solids from the ejector and press being adapted to be emptied into a receptacle.

It is another object of this invention to provide a novel combination of a pulper and a trap, with an ejector associated with the bottom of the trap for extracting solids collected from a slurry that is discharged from the pulper, along with a novel vent arrangement from the outlet of the trap.

Other objects and advantages of the present invention will be readily apparent to those skilled in the art from a reading of the following brief description of the drawing figures, detailed description of the preferred embodiment, and the appended claims.

IN THE DRAWINGS

FIG. 1 is a front elevational view, partially schematically illustrated, of a complete system in accordance with this invention, with portions of the various apparatus being illustrated in section, for the sake of clarity.

FIG. 2 is a transverse sectional view, taken along the line II—II of FIG. 1, and wherein the means for discharging solids from the hopper bottom of the trap is illustrated, along with means for ejecting the solids thus discharged into a receptacle.

FIG. 3 is a fragmentary transverse sectional view, similar to a portion of FIG. 3, but wherein an optional alternative bottom of the trap for solids ejecting is illustrated.

Referring now to the drawings in detail, reference is first made to FIG. 1, wherein there is illustrated a complete system in accordance with this invention, generally designated by the numeral 10.

The system 10 includes a pulping device 11, of the type which is adapted to pulp assorted debris therein, in a liquid medium. The pulping apparatus 11 is constructed generally along the lines of the pulping apparatus disclosed in U. S. Pat. No. 3,489,356, and has a top (not shown) that is adapted to be opened and receive a batch of assorted trash and the like therein. A fresh water supply 12 is provided to the pulping apparatus 11. An impeller plate 13 is disposed at the bottom of the apparatus 11, driven from a shaft 14 that in turn is driven by a suited pulley belt or like arrangement 15, with the impeller plate 13 having a plurality of abrading teeth 16 or the like for abrading, comminuting, shearing and the like of trash particles contained in the bottom of the apparatus 11, in a liquid medium 17 provided by water from the inlet 12. The particles thus achieve a desired size that is pre-selected in accordance with openings in a screen 18, and pass through such openings 20, into an evacuation chamber 21. It will be noted that the size of the openings 20 is selected in accordance with the desired capacity of the pulping apparatus 11, such that, as desired for the reasons set forth above, some solid particles may be passed into the discharge chamber 21, of the pulping tank 11. Thus, the discharge from the pulping tank 11 passes into a trap 22, carrying some undesirably sized particles. Once such undesirably sized solid particles, such as metal fragments, glass and the like enter the trap 22, they will tend to settle in the bottom of the trap 22, because the rate of flow of liquid through the trap 22 is substantially less than the rate of flow of that liquid through the discharge chamber 21, because of the increased size or sump-like effect attributed to the trap 22.

The liquid slurry in the trap 22, with the undesirably sized solid particles settled out therefrom, then leaves the trap, and passes, through a discharge line 23, into a second stage comminution apparatus 24. The apparatus 24 is adapted to positively grind any very small metal particles, such as hospital hyperdermic needles and the like, by engaging them between teeth on a rotating plate 25 and a toothed periphery 26 thereof, while also additionally abrading and severing fibers and other particles carried in the liquid medium of the pulped slurry, with such slurry also being pumped through the discharge line 27 to a press 28. The secondary comminution apparatus, as has been mentioned above, is of the positive grinding type, for physically engaging particles between the toothed periphery 26 and the plate teeth 25, in distinction to being a comminution apparatus of the pulping type, which continuously shreds or abrades particles carried past teeth 16 thereof in a liquid medium. Thus, the comminution apparatus 24 is of the type disclosed in application Ser. No. 730,331, filed May 20th, 1968, now U.S. Pat. No. 3,565,350. This second stage comminution apparatus 24 is driven by a suitable pulley belt arrangement 30 or the like, as desired.

The slurry, once entering the press 28 is compacted, with carried solid particles being substantially separated from the liquid medium, generally by means of single or double screw conveyors that squeeze the water from the solid particles in the press 28, with the water being drained through a suitable screen arrangement or the like, and with the solids being delivered upwardly, for discharge from the press 28 through a chute 31, into a waste receptacle 32.

It will be noted that the press 28 may preferably be of the general type disclosed in U. S. Pat. No. 3,426,677.

Water that is squeezed from the solid particles in the press 28 is delivered from the press 28 through a line 33, back into the pulping apparatus 11, for re-use as the carrying liquid medium.

It will further be noted that, in lieu of discharging from the trap 22, through the line 23, it may be desirable to discharge the liquid medium from the trap 22, directly to a press 28, depending upon whether or not the system is handling components such as hospital needles and the like requiring another stage of comminution. Also, if the waste included in the slurry that is being discharged through the line 23 from the trap 22 is desirably sized, the line 23 may be connected directly to a sewer, as another option.

It has been found desirable to place a vent line 34, as illustrated in FIG. 1, from the discharge line of the trap 22, for discharging gases and other substances back into the pulping apparatus 11, as illustrated. As has been mentioned above, the liquid in the trap 22 has a substantially reduced flow, due to the volume of the trap 22, and the ability of the trap 22 to act as a sump. Thus, rather than venting from the trap 22, which may perhaps lend itself to accumulation of some very light substances such as polystyrene and the like in the vent line, or else tend to clog the vent line, it has been found to be desirable to place the vent line 34 at the discharge of the trap 22, for venting at a location of increased flow of the liquid medium. By thus placing the vent line 34, some very light substances such as polystyrene foam will be carried past the opening 35 in the screen 36 at the inlet of the vent line 34, in a sufficiently rapid manner that they will not tend to accumulate across the opening 35 of the screen 36, whereby the vent line 34 will not become clogged, and such polystyrene foams and the like will be further comminuted within the apparatus 24. Thus, it will be clear that this placing of the vent line 34 will permit discharge of gases and emulsions and foams formed within the pulping apparatus and trap 22, to discharge through the openings 35, into the vent line 34, and back into the pulping apparatus 11. Such foams that are desired to be re-cycled back through the vent line 34 are those bubbly type of foam emulsions that are formed by the chemical and mechanical abrasion of fine particles in a liquid medium.

With particular reference to FIG. 2, it will be seen that the trap 22 is adapted to be maintained substantially full, if desired, in receiving a slurry through the opening 40 from the pulping apparatus discharge chamber 21. The trap 20 has a top cover 41, to prevent splashing of a slurry therefrom when the same is full. It will be noted that the bottom walls 42 through 45 of the trap 22 are sloped inwardly for conversions at an outlet 46. Thus, heavier solid trash and debris particles will tend to settle outwardly through the trap outlet opening 46, through the S-shaped discharge line 47, and be delivered into an ejector 48. The ejector 48 is adapted to contain a substantial volume of liquid medium, generally approximately of the same level as liquid medium within the hopper 22. The ejector 48 will generally include a conveyor 50 for example, of the chain type as illustrated, whereby chains 50 are carried on spaced sprockets 51 and 52 at, respectively, lower and upper ends of the ejector 48, with one sprocket such as that 52 being suitably driven by a motor and belt arrangement 54, such as that illustrated in FIG. 2. The chains 50 carry a plurality of identical bins 55, having bottoms 56 of screen wire or the like, which are adapted to scoop up solid debris gathering in the bottom 57 of the ejector 48, and to lift the same upwardly, as illustrated by those bins 55 at the left side of the ejector 48 in FIG. 2, until such bins 55 are above the liquid level within the ejector 48. As the bins 55 then round the upper end of the ejector 48 in the vicinity of the upper sprockets 52, the bins 55, from which the liquid has already been strained through the screen bottoms 56 thereof after such bins 55 have passed above the level of liquid in the ejector 48, then pass around the upper end of the sprockets 52, and become inverted, for easy discharge of solid material therefrom, downwardly through a hopper 58 thereof, into the receptacle 32.

The line 33 between the press 28 and the pulper 11 is provided with a "T" 60, to which is connected a water return line 61 from the press 28, with the lines 33 and 61 having suitable adjustable valves 62 and 63 for controlling the amount and pressure of return water to be delivered through the line 61 to the outlet 46 of the trap 22, from the press 28. The line 61 is connected to the trap outlet 46 at 64 either by itself, or optionally with a nozzle 65 at the juncture of the line 61 and trap outlet 46. Water from the press 28 passing into the trap 22 provides an assist or back flush for the trap 46 to help convey the solids from the trap 22 to the ejector 48, through a predetermined lateral distance, such as that illustrated in FIG. 2. The use of line 61 permits the conveyance of solids for several feet horizontally and eliminates the need for a specific position of the trap relative to the ejector.

It will thus be seen that there is presented an entire system of the type earlier described.

It will further be noted that there is an additional reason for venting emulsions and foams formed during the pulping apparatus prior to the passage of the slurry into the comminution apparatus 24. The apparatus 24 also functions as a pump, and emulsions and bubbly foams generally present substantial difficulty to pumps and to grinders of the type of apparatus 24, which thereby renders the use of a vent 34 to be highly desirable. By so locating the vent, that in addition to solving this problem, it is so located that it does not tend to clog with light styrene foams and the like, a unique overall arrangement is presented.

Because of the capability of the trap means 22, to act as a pump, it will be noted that in some instances, as when the pulping apparatus 11 is operating at a decreased capacity, it may be desirable to permit the trap 22 to fill periodically, with intermittant emptying of the accumulated solids by the use of the ejector 48, rather than continuous operation of the ejector 48 and commensurate continuous emptying of solids from the hopper bottom of the trap 22.

With reference to FIG. 3 in detail, a line 70 is illustrated, similar to that 61 of FIG. 2, for conveying back flush water to the ejector 73, with a portion 72 of the line 70 passing across the bottom of the trap 71 for drawing off liquid and solids from the bottom of the trap 71 in venturi fashion into the low pressure zone of the line portion 72 and carrying the same to the ejector, as an optional back flush arrangement. The line 70 could be provided with water from a press, such as that 28 of FIG. 1, or it could be a fresh water line, if desired, as also could be the line 61 in FIG. 1, if desired.

It will be apparent that other modifications and variations of the apparatus of this invention, as well as modifications of the use and operation thereof may all take place, within the spirit and scope of the invention as defined in the appended claims.

What is claimed is:

1. Apparatus for preparation of waste solids for disposal comprising means for receiving and pulping solids by abrasion in a liquid medium to a predetermined reduced particle size and having a pulp slurry discharge opening, and trap means having an inlet connected downstream of the discharge opening of said pulping means for receiving a pulp slurry discharged therefrom through a trap means inlet, said trap means having a slurry outlet for discharging a slurry therefrom and being provided with a solids outlet at the bottom thereof for discharge of heavier solids received from said pulping means, including means providing a separate water inlet to said solids outlet of said trap means for assisting removal of solids through said solids outlet.

2. The apparatus of claim 1, including solids ejector means connected at the solids outlet of said trap means for receiving solid debris in a liquid medium from said trap means and ejecting solid debris thus received from the liquid medium.

3. The apparatus of claim 1, wherein said solids outlet and said means providing a water inlet comprise means for facilitating lateral displacement of solids from said trap means.

4. The apparatus of claim 1, wherein said means providing a water inlet comprises venturi means.

5. The apparatus of claim 1, including a pressing apparatus in the combination connected to said other comminuting apparatus and adapted to receive a slurry therefrom and condense solids from the slurry.

6. The apparatus of claim 5, including a water return line connecting said pressing apparatus and said pulping apparatus for delivery of water extracted from condensed solids in said pressing apparatus back to said pulping apparatus, including valve means for controlling the flow of water from said water return line to said water inlet of said solids outlet.

* * * * *